United States Patent
Abdul et al.

(10) Patent No.: US 11,516,119 B2
(45) Date of Patent: Nov. 29, 2022

(54) SYSTEM, METHOD, AND DEVICE FOR COMMUNICATION BETWEEN NETWORK SEGMENTS

(71) Applicant: Siemens Canada Limited, Oakville (CA)

(72) Inventors: Amin Abdul, North York (CA); Michael Pustylnik, Toronto (CA); Tiejun Wang, Mississauga (CA)

(73) Assignee: SIEMENS CANADA LIMITED, Oakville (CA)

( * ) Notice: Subject to any disclaimer, the term of this patent is extended or adjusted under 35 U.S.C. 154(b) by 143 days.

(21) Appl. No.: 16/971,266

(22) PCT Filed: Mar. 23, 2018

(86) PCT No.: PCT/US2018/024006
§ 371 (c)(1),
(2) Date: Aug. 19, 2020

(87) PCT Pub. No.: WO2019/182608
PCT Pub. Date: Sep. 26, 2019

(65) Prior Publication Data
US 2021/0083969 A1    Mar. 18, 2021

(51) Int. Cl.
*H04L 45/48*    (2022.01)
*H04L 41/0813*    (2022.01)
(Continued)

(52) U.S. Cl.
CPC .......... *H04L 45/48* (2013.01); *H04L 41/0813* (2013.01); *H04L 41/12* (2013.01);
(Continued)

(58) Field of Classification Search
CPC ..... H04L 45/38; H04L 41/0813; H04L 41/12; H04L 45/021; H04L 45/28; H04L 45/52; H04L 45/66; H04L 45/48; H04L 12/462
See application file for complete search history.

(56) References Cited

U.S. PATENT DOCUMENTS 6,980,547 B1 * 12/2005 Gally .................... H04L 49/351
370/389
9,407,733 B1 * 8/2016 Mizrahi .................. H04L 12/40
(Continued)

FOREIGN PATENT DOCUMENTS

CN    103581164 A    2/2014
WO    2009082824 A1    7/2009

OTHER PUBLICATIONS

"Industrial communication networks—High availability automation networks—Part 3: Parallel Redundancy Protocol ( PRP) and High-availability Seamless Redundancy (HSR)", I EC 62439-3:2016, Mar. 31, 2016 (Mar. 31, 2016), pp. 1-64, XP082002758.
(Continued)

*Primary Examiner* — Walter J Divito
*Assistant Examiner* — Anthony Luo (57) ABSTRACT

A method of providing a path between bridges of a first network segment. The first network segment is configured using a Spanning Tree Protocol ('STP'). The method includes providing a second network segment interconnecting first and second bridges of said first network segment. The second network segment is operable to transmit frames adherent to a High-availability Seamless Redundancy ('HSR') network control protocol and to discard the STP control data frames. The method also includes modifying at a first Redundancy Box ('RedBox') STP control data frames to form modified data frames adherent to the HSR protocol. The method also includes modifying at a second RedBox,
(Continued)

the modified data frames to re-form the STP control data frames.

15 Claims, 8 Drawing Sheets

(51) Int. Cl.
- *H04L 41/12* (2022.01)
- *H04L 45/021* (2022.01)
- *H04L 45/28* (2022.01)
- *H04L 45/52* (2022.01)
- *H04L 45/00* (2022.01)
- *H04L 12/46* (2006.01)

(52) U.S. Cl.
CPC ............ *H04L 45/021* (2013.01); *H04L 45/28* (2013.01); *H04L 45/52* (2013.01); *H04L 45/66* (2013.01); *H04L 12/462* (2013.01)

(56) References Cited

U.S. PATENT DOCUMENTS

| | | | |
|---|---|---|---|
| 2009/0201943 A1* | 8/2009 | Li | H04L 43/50 370/465 |
| 2009/0285138 A1* | 11/2009 | Thomas | H04N 21/42204 370/310 |
| 2014/0025833 A1 | 1/2014 | Werner et al. | |
| 2014/0269288 A1* | 9/2014 | Crisan | H04L 47/2425 370/231 |
| 2018/0054324 A1 | 2/2018 | Yu | |
| 2018/0123887 A1* | 5/2018 | Thubert | H04L 47/828 |
| 2019/0173782 A1* | 6/2019 | Soliman | H04L 45/48 |

OTHER PUBLICATIONS

PCT International Search Report and Written Opinion of International Searching Authority dated Dec. 19, 2018 corresponding to PCT International Application No. PCT/US2018/024006 filed Mar. 23, 2018.

* cited by examiner

SYSTEM, METHOD, AND DEVICE FOR COMMUNICATION BETWEEN NETWORK SEGMENTS

FIELD

A system, method, and device for providing an alternative path to a first network segment using a second network segment.

BACKGROUND

Computer networks may be organized logically or physically into network segments. Each network segment may include a number of nodes and a number of links between the nodes of the network segment. Nodes of a particular network segment may communicate with one another across the links of that network segment.

Multiple network segments may also be interconnected with one another. Each of the network segments may adhere to one or more network control protocols (as used herein, the term 'network control protocol' may include any number of ISO layer 2 control protocols), and communication across segments may be possible using a common protocol, or through a node acting as a gateway between segments.

Establishing a path across multiple network segments using an arbitrary protocol, however, may not be possible as individual network nodes need not be adherent to all (or even multiple) network control protocols.

Accordingly, certain network segments will not interconnect others utilizing particular network control protocols. This presents particular limitations in establishing redundant paths across networks utilizing varying network control protocols.

Systems, methods, and devices that allow more flexible cross-segment communications may be desirable.

SUMMARY

In accordance with an aspect of the present disclosure, there is provided a method of providing a path between bridges of a first network segment configured using a Spanning Tree Protocol ('STP') on which STP control data frames are passed, the method comprising: providing a second network segment interconnecting first and second bridges of said first network segment, said second network segment operable to transmit frames adherent to a High-availability Seamless Redundancy ('HSR') network protocol and to discard said STP control data frames; modifying at a first Redundancy Box ('RedBox') STP control data frames to form modified data frames adherent to said HSR protocol, said first RedBox acting as a point of ingress to said second network segment, thereby enabling transport of said STP control data frames across said second network segment; and modifying at a second RedBox, said modified data frames to re-form said STP control data frames, said second RedBox acting as a point of egress from said second network segment, thereby providing said path between said first and second bridges.

In accordance with another aspect of the present disclosure, there is provided a method of providing a path between nodes of a first network segment configured using a first network control protocol, the method comprising: providing a second network segment interconnecting first and second nodes of said first network segment, said second network segment operable to transmit datagrams adherent to a second network protocol and to discard control datagrams adherent to said first network control protocol; modifying at a point of ingress to said second network segment, control datagrams of said first network control protocol to form modified control datagrams adherent to said second protocol, thereby enabling transport of said modified control datagrams across said second network segment; and modifying at a point of egress from said second network segment, said modified control datagrams to re-form control datagrams adherent to said first network control protocol, and thereby said second network segment to provide a segment along said path between said first and second nodes configured using said first network control protocol.

In accordance with another aspect of the present disclosure, there is provided a system for providing a path, the system comprising: a first network segment on which control datagrams adherent to a first network control protocol are passed; a second network segment operable to transmit datagrams adherent to a second network protocol and to discard control datagrams adherent to said first network control protocol; and first and second nodes interconnecting said first and second network segments, said first and second nodes providing a point of ingress for said control datagrams to said second network segment and a point of egress for said control datagrams to said first network segment, wherein said first and second nodes are configured to: at said point of ingress, modify control datagrams of said first network protocol to form modified control datagrams adherent to said second protocol, thereby enabling transport of said modified control datagrams across said second network segment, and at said point of egress, modify said modified control datagrams to re-form configuration datagrams adherent to said first network protocol, and thereby said second network segment to provide a segment along said path between said first and second nodes configured using said first network control protocol.

In accordance with another aspect of the present disclosure, there is provided a network communication device for providing a path between nodes of a first network segment on which control datagrams adherent to a first network control protocol are passed, the device comprising: a processor; a first port coupled to said first network segment; second and third ports coupled to a second network segment and interconnecting said first network segment to said second network segment, said second network segment operable to transmit datagrams adherent to a second network control protocol and to discard control datagrams adherent to said first network protocol; memory in communication with said processor; and software code stored in said memory, which, when executed by said processor, causes said network communication device to: at a point of ingress to said second network segment, modify control datagrams of said first network protocol to form modified control datagrams adherent to said second protocol, thereby enabling transport of said modified control datagrams across said second network segment, and at a point of egress from said second network segment, modifying said modified control datagrams to re-form control datagrams adherent to said first network protocol, and thereby said second network segment to provide a segment along said path between said first and second nodes configured using said first network control protocol.

Other aspects, features, and embodiments of the present disclosure will become apparent to those of ordinary skill in the art upon review of the following description of specific embodiments in conjunction with the accompanying figures.

BRIEF DESCRIPTION OF DRAWINGS

In the figures, which illustrate, by way of example only, embodiments of the present disclosure.

DETAILED DESCRIPTION

Figure 1A:
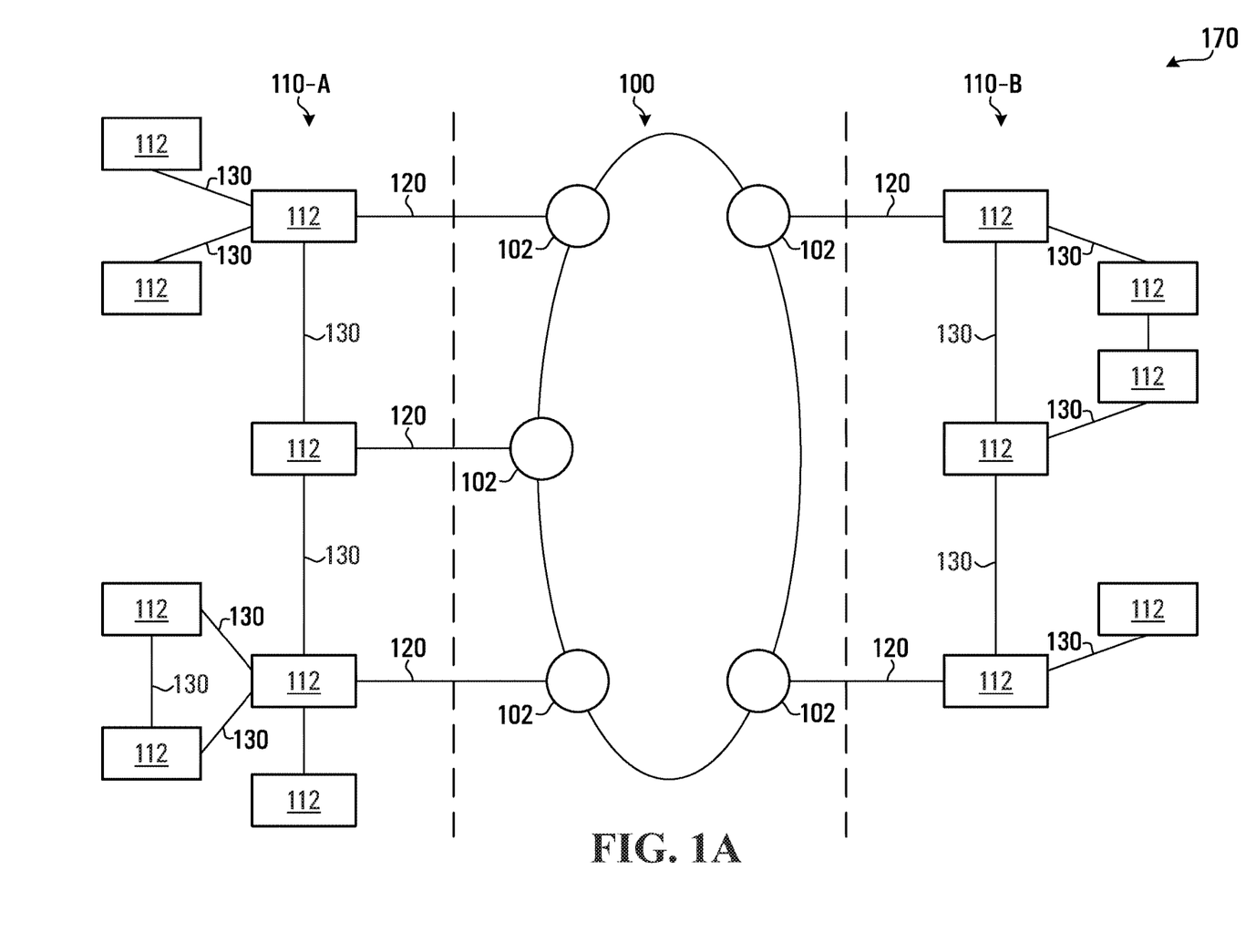
FIG. 1A illustrates, in block diagram form, a simplified view of example network.
Figure 1B:
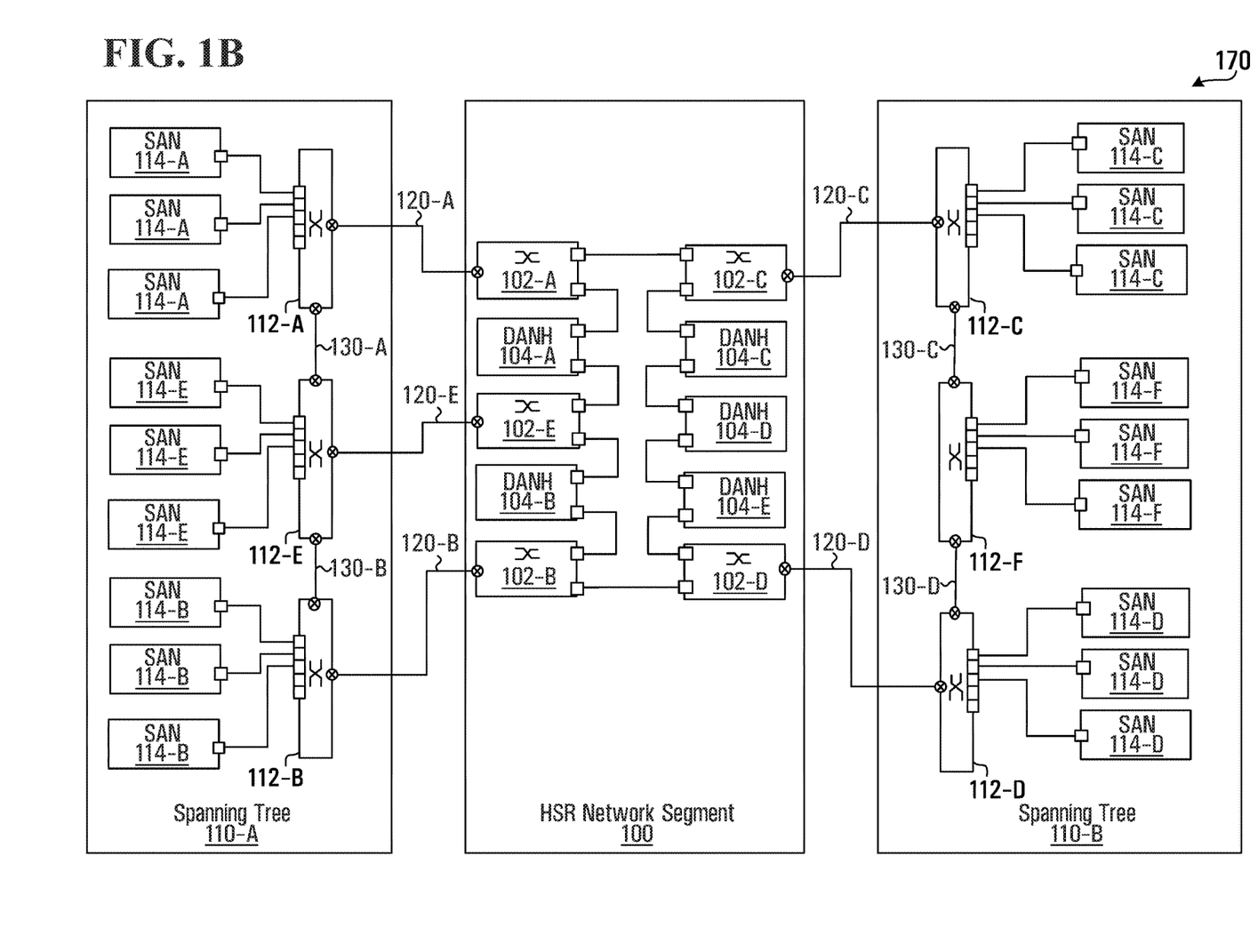
FIG. 1B illustrates, in block diagram form, a detailed view of the example network of FIG. 1A.

FIG. 1A illustrates a simplified view of an example network 170 which includes a number of bridges 112 configured in a tree topology and a number of nodes 102 configured in a ring topology. FIG. 1B illustrates a more detailed view of the example network 170 (however, FIG. 1B illustrates fewer bridges 112).

Each bridge 112 may have one or more ports for connecting the bridge 112 to one or more other bridges 112, edge nodes (such as SAN devices 114), and nodes 102.

Bridges 112, edge nodes, and nodes 102 may communicate with one another by passing data frames configured in accordance with an Ethernet protocol. Ethernet is detailed, for example, in the IEEE 802.3 specification, the contents of which are hereby incorporated by reference. For example, edge nodes may pass Ethernet data frames to a particular bridge 112 and that bridge 112 may then redirect the data frame to another edge node via a second bridge 112. Further, edge nodes may pass Ethernet data frames to a particular bridge 112 and that bridge 112 may then redirect the data frame to one of the nodes 102.

Bridges 112 may be configured as network segments that implement spanning trees 110-A and 110-B (collectively 'spanning trees 110'). Bridges 112 of the same network segment may have a common broadcast MAC address. Thus, a message may be broadcast of all bridges 112 of a network segment.

Bridges 112 may be configured as a spanning tree 110 using the Spanning Tree Protocol ('STP'). STP is a network control protocol detailed, for example, in the IEEE802.1 series of standards (which include IEEE 802.1D, 802.1s, and 802.1Q), the contents of which are hereby incorporated by reference. Bridges 112 of spanning tree 110 may be configured in accordance with any number of spanning tree protocols, including Spanning Tree Protocol ('STP'), Rapid Spanning Tree Protocol ('RSTP'), and Multiple Spanning Tree Protocol ('MSTP'). Such protocols may be defined in accordance with the IEEE 802.1 series of standards and in particular the IEEE 802.1D standard. As used herein, "STP" may refer to any spanning tree protocol.

Bridges 112 may pass control datagrams, such as Bridge Protocol Data Units ('BPDU'), to one another in accordance with an STP network control protocol. A type of a BPDU is a configuration message, which may include parameters for logically configuring spanning tree 110. A second type of a BPDU is a topology change notification ('TCN') message, which may indicate a change in the network topology of spanning tree 110. BPDUs are generally addressed to all the bridges 112 of spanning tree 110 by including a pre-defined, multicast, STP Bridge Group Address as the destination address.

In one embodiment, one bridge 112 of spanning tree 110 may be configured as a 'root bridge' to manage communication between other bridges 112. In an alternative embodiment, one bridge 112 of spanning tree 110 may be elected by the STP network control protocol as a 'root bridge'.

Configuration messages in a BPDU may include control information such as the path cost between two bridges 112 of spanning tree 110. The information sent is known as a 'spanning tree priority vector'. A spanning tree priority vector is sent from a sender bridge 112 to a recipient bridge 112 and provides the recipient bridge 112 with information about the cost of a path between the sender bridge and a root bridge. Each bridge 112 receives spanning tree priority vectors from other bridges 112 that it is directly connected to. By tallying up the cost information, each bridge 112 may identify the most cost effective path to the root bridge.

If more than one path exists between two bridges 112, each bridge 112 only forwards data packets to the other bridge 112 using the lowest cost path (for example, by using the highest bandwidth link). The second, higher cost, path will remain blocked until the topology of the spanning tree 110 changes and that path becomes either the only available path, or the lowest cost path. Accordingly, bridges 112 may configure themselves to utilize the cheapest available link by sending control messages (such as configuration messages and TCN messages) to one another. Furthermore, if one link fails, bridges 112 may identify and forward traffic over a second redundant link, thereby improving reliability of the spanning tree 110.

Bridges 112 may logically configure spanning tree 110 such that, at any given time, only one path between two bridges 112 is in an active forwarding state and all other possible paths are in a blocking state. This logical configuration may help prevent network loops that are likely to occur when there is more than possible path between two bridges 112.

Accordingly, STP is a network control protocol that builds a loop-free logical topology for Ethernet networks. STP serves to prevent bridge loops which may occur if more than one path is available for a bridge 112 of the network to route data traffic. STP also allows a network design to include backup links to provide fault tolerance if an active link fails. To achieve this, STP creates a spanning tree within a network of connected layer-2 bridges 112, and disables those links that are not part of the spanning tree, leaving a single active path between any two network nodes.

Nodes 102 of example network 170 of FIG. 1A may be configured as a HSR network segment 100, using a High-availability Seamless Redundancy ('HSR') network control protocol. HSR is a network control protocol that provides seamless failover in the event of failure of a network component. The redundancy is invisible to the application.

HSR nodes have two ports and act as a switch (bridge), which allows the nodes to arrange themselves into a ring, without dedicated switches.

Such HSR protocol may be defined in accordance with International Electrotechnical Commission (IEC) 62439 series of standards and in particular in IEC 62439-3:2016, the contents of all of which are hereby incorporated by reference.

HSR is suited for applications that request high availability and short switchover times. Example applications include protection for electrical substations, synchronized drives (e.g. in printing machines) or high power inverters. For such applications, the recovery time of commonly used control protocols, such as the STP, is too long.

HSR nodes typically require hardware support (FPGA or ASIC) to forward or discard frames within microseconds.

HSR network segment 100 includes a number of interconnected nodes 102. Each node 102 is connected to two other neighbor nodes 102 of HSR network segment 100. Nodes 102 may generate and send HSR data frames in accordance with the HSR network control protocol. Nodes 102 send HSR data frames to the two neighbor nodes 102 simultaneously.

Each spanning tree 110 may generally be interconnected to HSR network segment 100 at a number of nodes 102. For example, spanning tree 110-A is interconnected to three nodes 102 of HSR network segment 100 via interlinks 120, and spanning tree 110-B is interconnected to two nodes 102 of HSR network segment 100 via interlinks 120. Further, additional HSR network segments may be interconnected to HSR network segment 100, for example, by using a Quad-Box (not illustrated).

Nodes 102 may also be configured to receive, via interlinks 120, from bridges 112 of spanning tree 110, Ethernet data frames that are addressed to a node 102 of HSR network segment 100. Nodes 102 may modify the Ethernet data frames to generate a HSR data frame suitable for transmission across HSR network segment 100, and then transmit the HSR data frame to the addressed node 102.

HSR network segment 100 and spanning tree 110 implement different layer-2 network control protocols. Nonetheless, devices implementing either network control protocol (such as bridges 112 and nodes 102) may process and pass along datagrams that do not include STP control messages and that are formatted as an Ethernet frame. Accordingly, Ethernet data frames may be passed between HSR network segment 100 and spanning tree 110.

However, nodes 102 are configured to discard STP control messages (such as configuration messages and TCN messages) from bridges 112 of spanning tree 110. STP control messages allow bridges 112 to learn about the network topology, including available paths and the costs associated therewith.

Because nodes 102 discard STP control messages, bridges 112 will therefore ordinarily not learn about the path through HSR network segment 100. Thus, Ethernet data traffic between edge nodes (such as SAN devices 114 of FIG. 1B) of a spanning tree 110 is typically not transported via interlinks 120 or via links of HSR network segment 100. In other words, bridges 112 of spanning tree 110 will not pass Ethernet data frames addressed to an edge node of spanning tree 110 via HSR network segment 100.

Nonetheless, interlinks 120 and links of HSR network segment 100 may be advantageously utilized as an alternative/redundant path between edge nodes of spanning tree 110, for example, when an internal path, node, or other component spanning tree 110 is malfunctioning.

In the case of a malfunction, a link between two nodes of spanning tree 110 may be damaged and may slow down data traffic or prevent data traffic from flowing. While in some cases, spanning tree 110 may include an alternative internal link to allow data traffic to flow between two particular edge nodes, the alternative internal link may have a high cost (e.g. low bandwidth). Further, in some cases there may be no alternative internal link to transport internal data traffic between two particular edge nodes of spanning tree 110.

As will be explained further, to utilize interlinks 120 and links of HSR network segment 100 as an alternative/redundant path between edge nodes of spanning tree 110, one or more nodes 102 of HSR network segment 100 may be configured to identify, modify, and then transmit, to neighbor nodes 102, STP control messages (such as configuration messages and TCN messages) from bridges 112 of spanning tree 110. By modifying the STP control messages, bridges 112 of spanning tree 110 may learn about the path through HSR network segment 100, and may direct traffic between edge nodes of spanning tree 110 through HSR network segment 100.

At the point of ingress from spanning tree 110 to HSR network segment 100, a node 102 interconnecting HSR network segment 100 with spanning tree 110 may modify control datagrams configured according to the STP protocol (such as configuration messages and TCN messages) to form modified control datagrams. The modified datagrams are adherent to the HSR protocol and are suitable for transmission across HSR network segment 100. The modified control datagrams may then be transported across the HSR network segment 100, until the modified control datagrams reach a second node 102 (at a point of egress from HSR network segment 100 to spanning tree 110). At the point of egress, the second node 102 may further modify the modified control datagrams to re-form control datagrams adherent to the STP protocol. The re-formed control datagrams may then be transmitted to bridges 112 of spanning tree 110.

Upon receipt of the re-formed control datagram at a bridge 112, that bridge 112 may then learn of the path through HSR network segment 100. The bridge 112 may also direct traffic through HSR network segment 100, via the point of ingress to HSR network segment 100, to the point of egress from HSR network segment 100.

Furthermore, each spanning tree 110 is interconnected to HSR network segment 100 at two or more points of interconnection. For example, spanning tree 110-A is interconnected to HSR network segment 100 at three different points, and spanning tree 110-B is interconnected to HSR network segment 100 at two different points. Thus, if one point of point of interconnection fails, an alternative point of interconnection may be utilized to transport data packets between HSR network segment 100 and spanning tree 110. Any of the following elements, at a point of interconnection, may fail: a node 102, an interlink 120, or a bridge 112 that is connected to a node 102.

By modifying the STP control messages, bridges 112 of spanning tree 110 may also learn about the path to HSR network segment 100 through different points of interconnection, and may direct traffic between edge nodes of spanning tree 110 using an alternative point of interconnection.

Furthermore, bridges 112 may, from time to time, send to one another a STP control messages including a topology change notification ('TCN'). A TCN message indicates a change in the network topology (for example, that the cost of a path has changed or that a path is no longer available). However, nodes 102 interconnecting spanning tree 110 and HSR network segment 100 may not be capable of processing such TCN messages. Thus, nodes 102 interconnecting spanning tree 110 and HSR network segment 100 may become outdated, resulting in misdirected data packets.

A TCN message may be transmitted along HSR network segment 100 by a node 102 at an ingress point to HSR network segment 100 from spanning tree 110. The TCN message may reach a node 102 at an egress point from HSR network segment 100 to spanning tree 110. Upon receiving a TCN message at a node 102 at an egress point from HSR network segment 100 to spanning tree 110, node 102 may delete all entries in its proxy table. After deleting all entries in the table, node 102 may rebuild its proxy table by monitoring messages from nodes of spanning tree 110. By deleting and rebuilding the proxy table, the proxy table at nodes 102 interconnecting spanning tree 110 and HSR network segment 100 is maintained in an up-to-date state, allowing for data packets to be directed correctly.

Reference is now made to FIG. 1B, illustrating example network 170 in more detail.

HSR network segment 100 may include a number of doubly attached nodes implementing HSR ('DANH'), including DANH 104-A, 104-B, 104-C, 104-D, and 104-E, (hereinafter referred to collectively as "DANH devices 104").

HSR network segment 100 may also include a number of redundancy boxes ('RedBox'), including RedBox devices 102-A, 102-B, 102-C, 102-D, and 102-E (hereinafter referred to collectively as "RedBox devices 102"). RedBox devices 102 interconnect HSR network segment 100 to spanning tree 110.

Each DANH device 104 includes two input/output Ethernet ports. One of the two ports is coupled to a port of a first neighbor DANH device 104 (or RedBox 102) and the second one of the two ports is coupled to a port of a second neighbor DANH device 104 (or RedBox 102). In one example, device 104-D is connected to both DANH device 104-C and DANH device 104-E. All DANH devices 104 of HSR network segment 100 are connected to one another to form a ring (referred to as an 'HSR ring').

An application of a DANH device 104 may generate data which DANH device 104 may send in a data frame to a recipient DANH device 104 via both ports simultaneously. A DANH device 104 may also receive data frames from either neighbor, and may forward the data to the other neighbor DANH device 104, thereby causing data frames to circulate in the HSR ring. Thus, any data frame in the HSR ring has two possible paths to reach the recipient DANH device 104 (either clockwise or counterclockwise), thereby providing HSR network segment 100 with redundancy.

Each RedBox device 102 includes at least three Ethernet input/output ports, two of which are configured to connect to nodes of HSR network segment 100 and one (or more) of which is (are) configured to connect to spanning tree 110. RedBox device 102 behaves substantially similarly to DANH devices 102 but may also implement additional functionality, as will be explained in more detail. For example, RedBox device 102 may identify data frames circulating in HSR network segment 100 that are addressed to a device in spanning tree 110 and may modify those data frames for transmission to spanning tree 110. Similarly, RedBox device 102 may receive data frames, including control messages, from nodes of spanning tree 110, and may modify those data frames for transmission across HSR network segment 100.

As illustrated in FIG. 1B, HSR network segment 100 includes five DANH devices 104 and five RedBox devices 102; however, varying numbers of DANH devices 104 or RedBox devices 102 may be connected to HSR network segment 100.

As illustrated in FIG. 1B, each spanning tree 110 of example network 170 may include a number of nodes that provide bridging and switching functions, including nodes 112-A, 112-B, 112-C, 112-D, 112-E, and 112-F (hereinafter referred to collectively as "bridges 112"). As illustrated in FIG. 1B, each spanning tree 110 includes three bridges 112; however, varying numbers of bridges devices may be connected within each spanning tree 110.

Each bridge 112 may have coupled thereto one or more single attached node ('SAN') devices 114 (which operate as edge nodes). As shown, bridge 112-A has coupled thereto SAN devices 114-A, bridge 112-B has coupled thereto SAN devices 114-B, bridge 112-C has coupled thereto SAN devices 114-C, bridge 112-D has coupled thereto SAN devices 114-D, bridge 112-E has coupled thereto SAN devices 114-E, and bridge 112-F has coupled thereto SAN devices 114-F. While each bridge 112 is shown to have three SAN devices 114 coupled thereto, each bridge 112 may have coupled thereto any number of SAN devices 114.

Unlike DANH devices 104, each SAN device 114 of spanning tree 110 has only one input/output Ethernet port, and thus cannot be connected to HSR network segment 100 directly. A SAN device 114 may be interconnected to HSR network segment 100 using a RedBox device 102, which acts as a proxy for the SAN device 114 attached thereto. Examples of SAN devices 114 include workstations, printers, sensing devices, and so forth.

Each spanning tree 110 may also include one or more internal links 130 for connecting bridges 112 of that spanning tree. For example, spanning tree 110-B is shown to include a link 130-C between bridge 112-C and bridge 112-F and a link 130-D between bridge 112-D and bridge 112-F. Similarly, spanning tree 110-A is shown to include a link 130-A between bridge 112-A and bridge 112-E and a link 130-B between bridge 112-B and bridge 112-E.

HSR network segment 100 is interconnected to each spanning tree 110 using two or more interlinks 120. For example, spanning tree 110-A is interconnected to HSR network segment 100 at three nodes: bridges 112-A, 112-E, and 112-B are interconnected to RedBox devices 102-A, 102-E, and 102-B via interlinks 120-A, 120-E, and 120-B respectively. Similarly, spanning tree 110-B is interconnected to HSR network segment 100 at two nodes: bridges 112-C and 112-D are interconnected to RedBox devices 102-C and 102-D via interlinks 120-C and 120-D respectively.

By interconnecting HSR network segment 100 and each spanning tree 110 using two or more interlinks 120, data traffic from a bridge 112 of a spanning tree 110 can be directed to another bridge 112 of that spanning tree 110 by using links and nodes of HSR network segment 100.

In other words, HSR network segment 100 may provide a redundant path to allow nodes of spanning tree 110 to transport traffic internal to the spanning tree 110 to one another. The redundant path through HSR network segment 100 may be utilized by bridges 112 of spanning tree 110 if an internal path, node, or other component of spanning tree 110 is malfunctioning.

As shown in FIG. 1B, spanning tree 110 may not have an alternative link 130 for data traffic between two particular bridges. Should one of the bridges 112, or a link 130 in between bridges 112 malfunction, one or more SAN devices 114 may be cut off from part of the network segment 110. For example, should link 130-D between bridge 112-D and bridge 112-F malfunction, then SAN devices 114-D will not have a path within spanning tree 110-B for communication with SAN devices 114-F (and vice-versa).

Spanning tree 110 may therefore utilize HSR network segment 100 as an alternative path. For example, when link 130-D between bridge 112-D and bridge 112-F malfunctions, bridge 112-D may send datagrams to bridge 112-F or to bridge 112-C via HSR network segment 100 (see, for example, FIG. 9).

A RedBox device 102, may act as an ingress point to HSR network segment 100, and may modify control datagrams adherent to the STP protocol (such as configuration messages and other control messages) to generate modified control datagrams adherent to the HSR protocol. Thus, the ingress RedBox device 102 may enable transport of the modified control datagrams across HSR network segment 100.

The ingress RedBox device 102 may then forward the modified control datagram within HSR network segment 100. Other nodes of HSR network segment 100 will continue forwarding the modified control datagram within HSR network segment 100 until it reaches an egress RedBox device 102 acting as an egress point to spanning tree 110. The egress RedBox device 102 may identify the modified control datagram as a modified control datagram that is directed to a node of spanning tree 110, and thus may re-form the modified datagram to form control datagrams adherent to the STP protocol, and send the reformed control datagram to bridge 112.

Bridge 112, upon receiving the reformed datagram may learn of the path between it and another bridge 112 of spanning tree 110 via HSR network segment 100.

Figure 9:
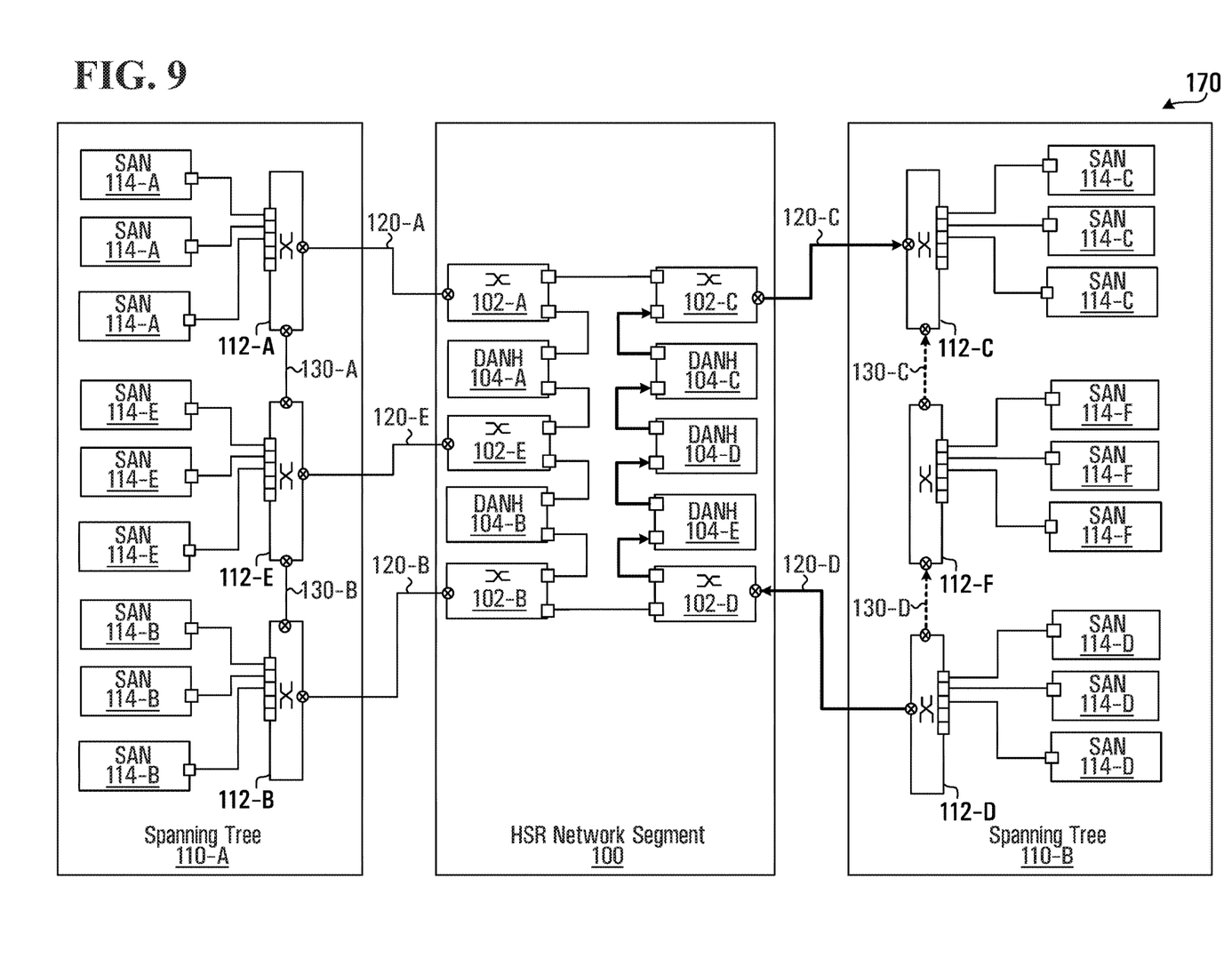
FIGS. 9-10 illustrate, in block diagram form, embodiments of the example network of FIGS. 1A-1B.

In one particular example, as shown in FIG. 9, RedBox device 102-D, acts as an ingress point to HSR network segment 100 for datagrams of bridge 112-D. RedBox device 102-D may modify control datagrams, such as configuration messages and other control messages generated by bridge 112-D, and forward the modified control datagrams within HSR network segment 100. Other nodes of HSR network segment 100 will continue forwarding the modified control datagrams within HSR network segment 100 until it reaches RedBox device 102-C acting as an egress point to bridge 112-C of spanning tree 110-B. RedBox device 102-C may re-form the modified datagram to form control datagrams adherent to the STP protocol, and send the reformed control datagram to bridge 112-C.

Bridge 112-C, upon receiving the reformed control datagram, may learn of the path between it and bridge 112-D via HSR network segment 100. Bridge 112-C may therefore forward data packets directed to bridge 112-D via HSR network segment 100 if either link 130-D or link 130-C is malfunctioning. In other words, HSR network segment 100 may be utilized as a redundant path between bridges 112 of spanning tree 110.

Further, as previously noted, HSR network segment 100 is interconnected to each spanning tree 110 using two or more interlinks 120. While one RedBox 102 and one interlink 120 are sufficient to interconnect HSR network segment 100 and spanning tree 110, connecting HSR network segment 100 and spanning tree 110 using more than one RedBox device 102 and interlink 120 may be advantageous. The additional RedBox device 102 and interlink 120 may provide an alternative path between HSR network segment 100 and spanning tree 110 in case of failure of either the first RedBox device 102 or interlink 120. Thus, reliability of communication between nodes of HSR network segment 100 and nodes of spanning tree 110 may be improved.

Upon failure of a RedBox device 102 or interlink 120, a bridge 112 that is connected to the failed RedBox device 102 or interlink 120 may propagate updated STP control messages to notify other bridges 112 of the failure. Bridges 112 of spanning tree 110 may therefore learn of the failure of a RedBox device 102 or interlink 120 upon receiving the updated STP control messages and direct data packets via the functional RedBox device 102 and interlink 120.

Figure 2:
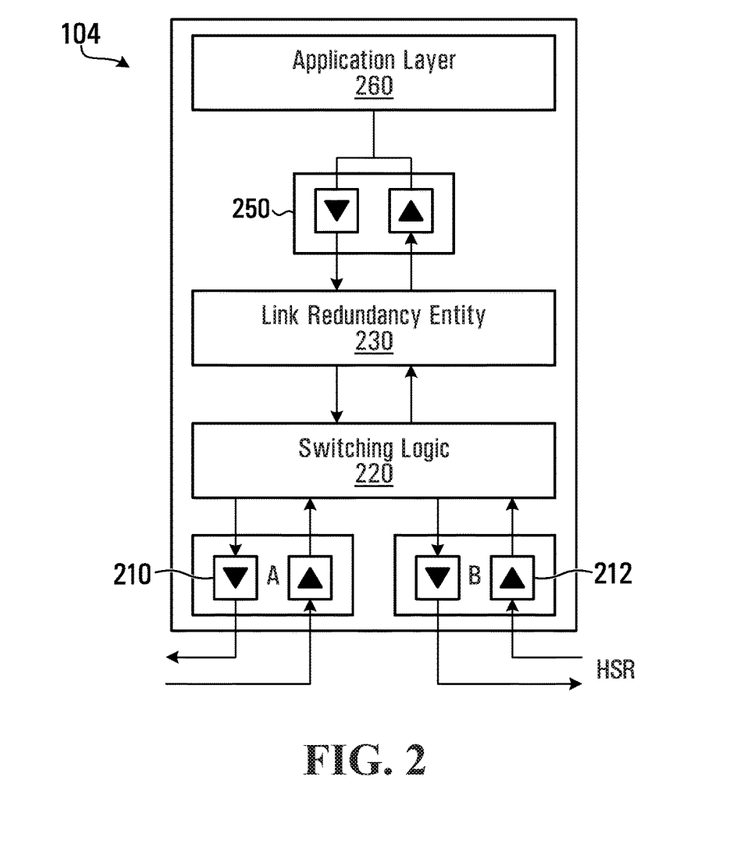
FIG. 2 illustrates, in block diagram form, a high level diagram of a first network node of the example network of FIGS. 1A-1B.

Reference is made to FIG. 2, illustrating in block-diagram form a logical structure of a DANH device 104 for use with HSR network segment 100. DANH device 104 includes two input/output Ethernet ports 210, 212, switching logic 220, link redundancy entity 230, link layer interlink 250, and application layer 260. DANH device 104 also includes a processor (not shown) and memory (not shown) in communication with the processor and storing software code for performing the various functions of DANH device 104.

DANH device 104 may receive HSR datagrams 300 (as illustrated, by way of example, in FIG. 3) at either port 210, 212. Two copies of each HSR datagram 300 are expected to arrive at DANH device 104, one at each port 210, 212. Each HSR datagram 300 includes an HSR tag 310, which allows other DANH devices 104 to distinguish and drop duplicate frames.

Figure 3:
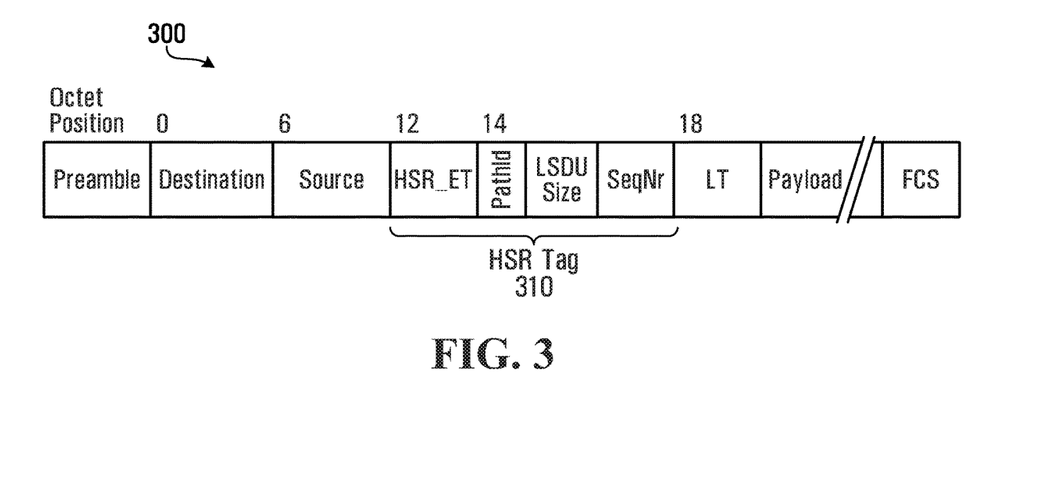
FIG. 3 illustrates a data frame formatted in accordance with a first network control protocol for use with the example network of FIGS. 1A-1B.

Upon receiving a HSR datagram 300 at one port, switching logic 220, operating under control of software code stored in memory, may determine, based on the destination address of HSR datagram 300, whether that DANH device 104 is the destination of the datagram. If so, then switching logic 220 may forward HSR datagram 300 to link redundancy entity 230. Link redundancy entity 230 may determine whether HSR datagram 300 is a duplicate datagram (i.e. the second copy received at that DANH device 104), and if so, discard that datagram. If HSR datagram 300 is not a duplicate datagram, then link redundancy entity 230 may forward HSR datagram 300 to application layer 260 via link layer interlink 250.

If switching logic 220 determines that DANH device 104 is neither the destination nor the source of HSR datagram 300, then switching logic 220 will simply forward HSR datagram 300 via the alternate port (i.e. if HSR datagram 300 was received at port 210, forward HSR datagram 300 via port 212, and vice-versa).

To send a datagram from application layer 260, application layer 260, operating under control of software code stored in memory, may forward the datagram to link redundancy entity 230 via link layer interlink 250. Link redundancy entity 230 may duplicate the datagram and encapsulate the two copies into two HSR compliant datagrams 300, each including a HSR tag 310. Link redundancy entity 230 then forwards one duplicate frame via port 210 and the other duplicate frame via port 212 so that the frames traverse HSR network segment 110 in opposite directions (clockwise and counterclockwise).

Examples of DANH devices include time sensitive devices, such as electrical substation protection relays, industrial control devices, and so forth.

Figure 4:
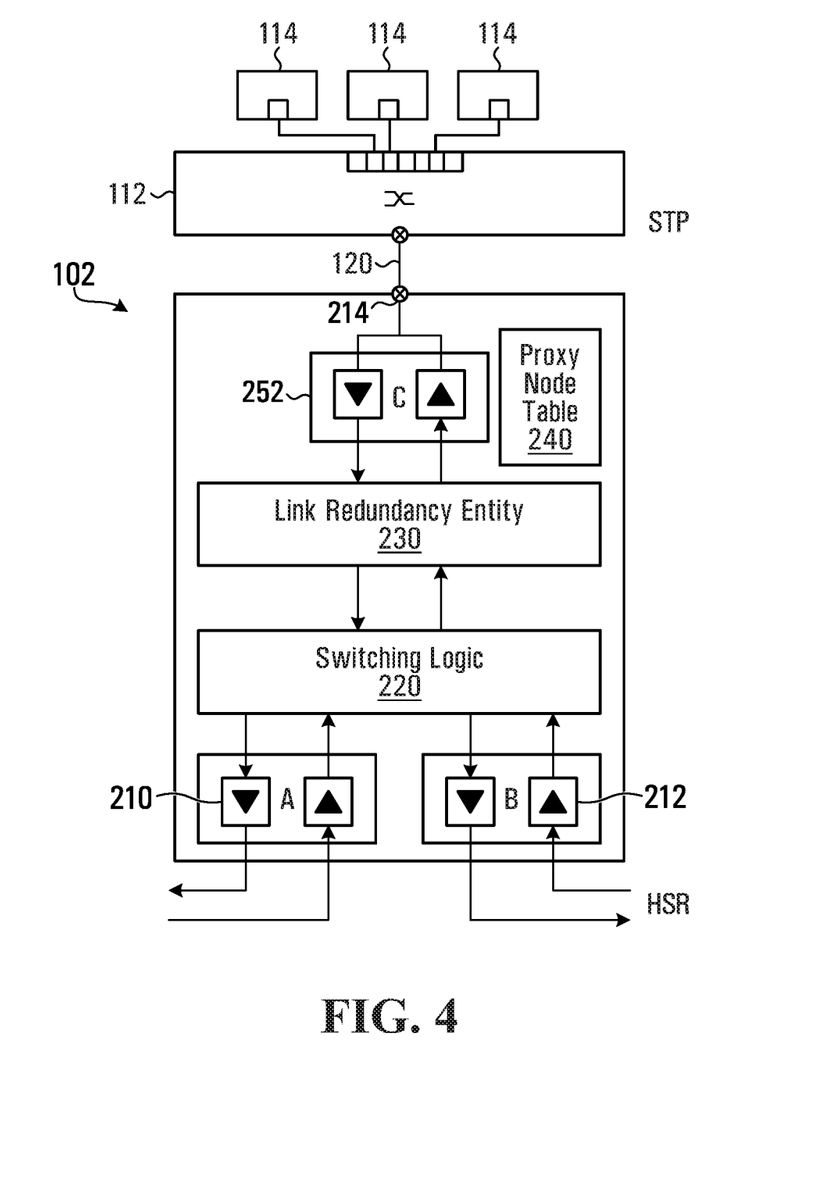
FIG. 4 illustrates, in block diagram form, a high level diagram of a second network node of the example network of FIGS. 1A-1B.

Reference is made to FIG. 4, illustrating in block-diagram form a logical structure of a RedBox device 102 for interconnecting HSR network segment 100 with spanning tree 110. RedBox device 102 implements at least some of the same functionality as DANH device 104 (FIG. 2). Like DANH device 104, RedBox device 102 includes two input/output Ethernet ports 210, 212, switching logic 220, and link redundancy entity 230. The operation of these components in RedBox device 102 is substantially similar to the operation in DANH device 104. RedBox device 102 also includes a processor (not shown) and memory (not shown) in communication with the processor and storing software code for performing the various functions of RedBox device 102.

In addition, RedBox device 102 also includes a third input/output Ethernet port 214 for interfacing with spanning tree 110. RedBox device 102 may be interconnected to bridge 112 through port 214 and via interlink 120. In some embodiments, interlink 120 and bridge 112 may be implemented internally to RedBox device 102, but in other embodiments, interlink 120 and bridge 112 may be implemented externally to RedBox device 102.

RedBox devices 102 that interconnect HSR network segment 100 to the same spanning tree 110 may be configured to have the same domain identification value, which is different from other RedBox devices 102 that do not interconnect HSR network segment 100 to that spanning tree 110. In other words, RedBox devices 102 that are points of egress or ingress to or from the same spanning tree 110 may be configured to have the same domain identification value.

For example, RedBox devices 102-A, 102-B, and 102-E (which interconnect HSR network segment 100 to spanning tree 110-A) may be configured to have a first domain identification value, and RedBox devices 102-C and 102-D (which interconnect HSR network segment 100 to spanning tree 110-B) may be configured to have a second domain identification value that is different from the first domain identification value.

In one example, the domain identification value is a two digit hexadecimal value; i.e. a value within the range of 0x00 to 0xFF.

By configuring RedBox devices 102 that interconnect to the same spanning tree 110 to have the same domain identification value, RedBox devices 102, operating under control of software code stored in memory, may more efficiently manage and direct data traffic to each spanning tree 110. For example, when a datagram arrives at a particular RedBox device 102, that RedBox device 102 may first determine whether that the datagram is associated with the spanning tree 110 which it is connected to. If so, RedBox device 102 may modify the datagram and transmit the modified datagram to that spanning tree 110. On the other hand, if not, RedBox device 102 may simply forward the datagram along to a neighbor DANH device 104 or to a neighbor RedBox device 102 without modification.

When only two RedBox devices 102 are configured to have the same domain identification value, STP datagrams, such as STP data traffic and STP control messages, may be configured to only have one point of egress from HSR network segment 100. For example, RedBox device 102-C and RedBox device 102-D may be configured to have the same domain identification value. Accordingly, a control message from bridge 112-C that enters HSR network segment 100 through RedBox device 102-C may be configured to only exit HSR network segment 100 through RedBox device 102-D to bridge 112-D.

Since only one point of egress from HSR network segment 100 is available, the path between bridge 112-C and bridge 112-D through HSR network segment 100 may simulate a point-to-point link. A point-to-point link operates in full-duplex mode. In one embodiment, a bridge 112 coupled to RedBox device 102 may be configured to recognize the link as a point-to-point link. In another embodiment, a bridge 112 coupled to RedBox device 102 may automatically detect that the link is a point-to-point link, if it operates in full-duplex mode.

Figure 5:
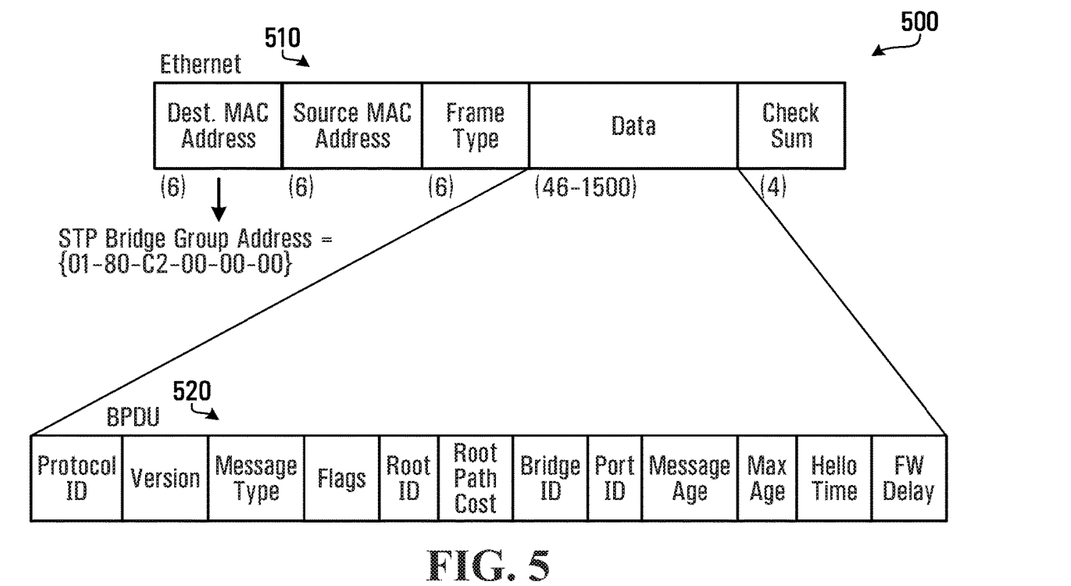
FIG. 5 illustrates a control data frame formatted in accordance with a second network control protocol for use with the example network of FIGS. 1A-1B.

On the other hand, when more than two RedBox devices 102 are configured to have the same domain identification value, control messages of spanning tree 110, such as configuration messages, may have more than one point of egress from HSR network segment 100. For example, RedBox device 102-A, RedBox device 102-B and RedBox device 102-E may be configured to have the same domain identification value. A control message from bridge 112-A that enters HSR network segment 100 through RedBox device 102-A may exit HSR network segment 100 through RedBox device 102-E to bridge 112-E or through RedBox device 102-B to bridge 112-D.

Since more than one point of egress from HSR network segment 100 is available, the path between any two bridges 112-A, 112-B, and 112-E of spanning tree 110-A through HSR network segment 100 may simulate a shared-media link. A shared-media link operates in half-duplex mode; thus, may require the use of a collision detection algorithm (which is not required full-duplex transmission). This additional requirement is helpful to improve data integrity in half-duplex mode, but may introduce delays in the transmission. In one embodiment, a bridge 112 coupled to RedBox device 102 may be configured to recognize the link as a shared-media link. RedBox device 102 also includes a RedBox link layer interlink 252 which may, operating under control of software code stored in memory, receive STP datagrams 500 (FIG. 5) that are adherent to the STP network control protocol at port 214 from spanning tree 110, including STP control datagrams.

An example STP datagram 500 is shown in FIG. 5. STP datagram 500 may be packaged as an Ethernet frame 510. Ethernet frame 510 may include a BPDU 520 (which may be either a configuration or a TCN message) as its data payload.

The Destination MAC address of an STP datagram 500 carrying a BPDU 520 is set to a pre-defined, multicast, STP Bridge Group Address. The STP Bridge Group Address is pre-defined as: {01-80-C2-00-00-00} in the STP specification (but other values may be used for different specifications). The STP Bridge Group Address may be characterized as a multicast address as the address identifies any number of bridges 112. BPDU 520 may include a spanning tree priority vector to allow other bridges 112 to identify the most cost effective path to the root bridge.

Figure 6:
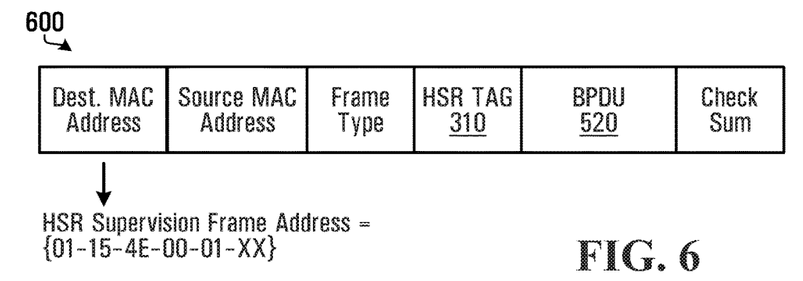
FIG. 6 illustrates a modified control data frame formatted in accordance with the first network control protocol for use with the example network of FIGS. 1A-1B.

RedBox device 102 may, operating under control of software code stored in memory, modify STP datagram 500 to form HSR datagram 600 (FIG. 6) that is adherent to the HSR protocol and which includes BPDU 520 as payload. An example HSR datagram 600 including BPDU 520 as payload is illustrated in FIG. 6.

Modifying, by RedBox device 102, a received STP datagram 500 to form a HSR datagram 600 may include replacing the Destination MAC address of the STP datagram with the, pre-defined, multicast, HSR Supervision Frame MAC address and appending thereto the domain identification value of that RedBox device 102. The HSR Supervision Frame MAC Address is pre-defined, in the HSR specification, as: {01-15-4E-00-01-XX}, where 'XX' may be configured as any value from 0x00 to 0xFF (but other values may be used for different specifications). RedBox device 102 may also insert the domain identification value associated therewith as the last two digits of the HSR Supervision Frame MAC Address (i.e. XX=the domain identification value of the RedBox device 102).

Modifying a STP datagram 500 may also include adding HSR tag 310 to the STP datagram 500.

After modifying STP datagrams 500, RedBox link layer interlink 252 may, operating under control of software code stored in memory, send HSR datagrams 600, which are adherent to the HSR protocol, via ports 210, 212, to DANH devices 104 in HSR network segment 100.

Although HSR datagrams 600 include STP control messages (i.e. BPDU 520), DANH devices 104 in HSR network segment 100 will not discard the HSR datagrams 600 as the control messages (such as BPDU 520) are a payload to a HSR compliant data frame.

DANH devices 104 and RedBox devices 102 may receive, at ports 210, 212, from HSR network segment 100, HSR datagram 600. DANH devices 104 are configured to multicast (i.e. forward) HSR datagrams 600 as they include the HSR Supervision Frame MAC address as the Destination MAC address. Thus, DANH devices 104 may forward HSR datagrams 600 without further processing.

In one embodiment, RedBox devices 102 are configured to multicast HSR datagrams 600 that have the HSR Supervision Frame MAC address as the Destination MAC address and also have a domain identification value that is different from the domain identification value associates therewith. Thus, a RedBox device 102 may forward HSR datagrams 600 without further processing unless the HSR datagram 600 has a domain identification value equal to its own domain identification value.

Figure 7:
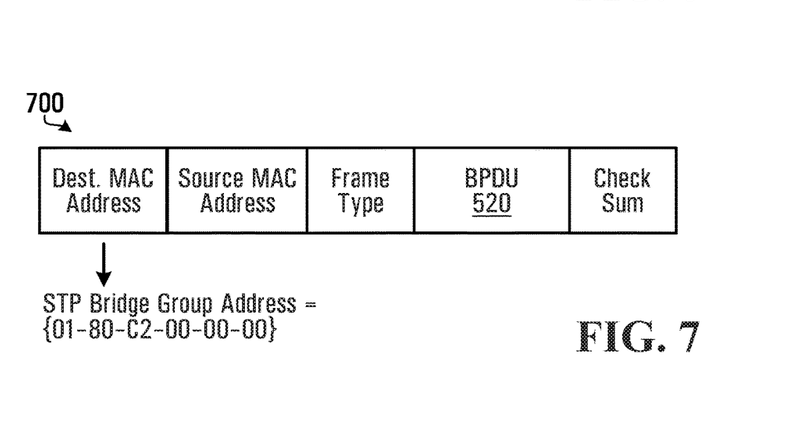
FIG. 7 illustrates a re-formed control data frame formatted in accordance with the second network control protocol for use with the example network of FIGS. 1A-1B.

A RedBox device 102 may also be configured to receive, at ports 210, 212, from HSR network segment 100, a HSR datagram 600 that includes a domain identification value equal to its own domain identification value. RedBox device 102 may re-form such HSR datagrams 600 to form re-formed STP datagrams 700 adherent to the STP protocol. An example re-formed STP datagram 700 is illustrated in FIG. 7.

In one embodiment, RedBox device 102 may be configured to re-form a HSR datagram 600 by replacing a Destination MAC address of HSR datagram 600 with the STP Bridge Group Address, which is be pre-defined in the STP specification as: {01-80-C2-00-00-00}.

Re-forming a HSR datagram 600 may also include removing HSR tag 310 from HSR datagram 600.

In one embodiment, RedBox device 102 may be configured to only re-form HSR datagrams that include a BPDU 520, such as HSR datagram 600. RedBox device 102 may examine the payload to identify a BPDU 520, for example by matching the payload to the known BPDU format. Alternatively, RedBox device 102 may determine that a HSR datagram 600 includes BPDU 520 if the Destination MAC address of the datagram includes the domain identification value associated therewith.

In one embodiment, RedBox device 102 may be configured to only re-form received HSR datagrams 600 if the received datagrams are identified as belonging to the spanning tree 110 that RedBox device 102 is connected to. For example, RedBox device 102 may determine whether the Destination MAC address includes both the HSR Supervision Frame MAC address and the domain identification value associated with that RedBox, and if so, modify the received datagrams and send the modified datagrams. RedBox device 102 may simply forward HSR datagrams 600 if the received datagrams are identified as not belonging to the spanning tree 110 that RedBox device 102 is connected to.

RedBox link layer interlink 252 may, operating under control of software code stored in memory, send re-formed STP datagrams 700, via port 214, to a bridge 112 in spanning tree 110.

RedBox 102 may also include proxy node table 240 stored in a memory thereof. When RedBox device 102 receives a datagram from a node of spanning tree 110 (including bridges 112 and SAN devices 114), RedBox device 102 may be configured to add an entry in proxy node table 240 listing the Source MAC Address of that node, thereby allowing RedBox device 102 to direct datagrams to that node in future. RedBox device 102 may create a new entry in proxy node table 240 if the Source MAC address is not already included in proxy node table 240.

Upon receiving an HSR datagram at either port 210, 212, RedBox device 102 may be configured to query proxy node table 240 to determine if the HSR datagram is to be re-formed for sending to a bridge 112 via port 214. RedBox device 102 may re-form the HSR datagram if the Destination MAC Address of the HSR datagram is included in the proxy node table 240. Alternatively, if the Destination MAC Address of the HSR datagram is not included in the proxy node table 240, RedBox device 102 may forward the HSR datagram into HSR ring 100 via either port 210, 212.

RedBox device 102 may be configured to update proxy node table 240 from time to time. For example, if after sending a datagram to a node at an address retrieved from proxy node table 240, and no response is received within a pre-defined period of time (i.e. a time-out event occurs), then RedBox device 102 may delete that entry.

Similarly, RedBox device 102 may be configured to delete all entries of proxy node table 240, for example, upon receiving, from HSR network segment 100, a topology change notification ('TCN') message indicating a change in the network topology of spanning tree 110. In one example, a TCN may indicate that the cost of a path has changed or that a path is no longer available).

After deleting all entries of proxy node table 240, RedBox device 102 may be configured to rebuild proxy node table 240 by monitoring messages from nodes of spanning tree 110 (i.e. messages from bridges 112 and from SAN devices 114, which may be received via port 214 of RedBox device 102).

By deleting and rebuilding proxy node table 240, the table is maintained in an up-to-date state, allowing for data packets to be directed correctly.

Figure 8:
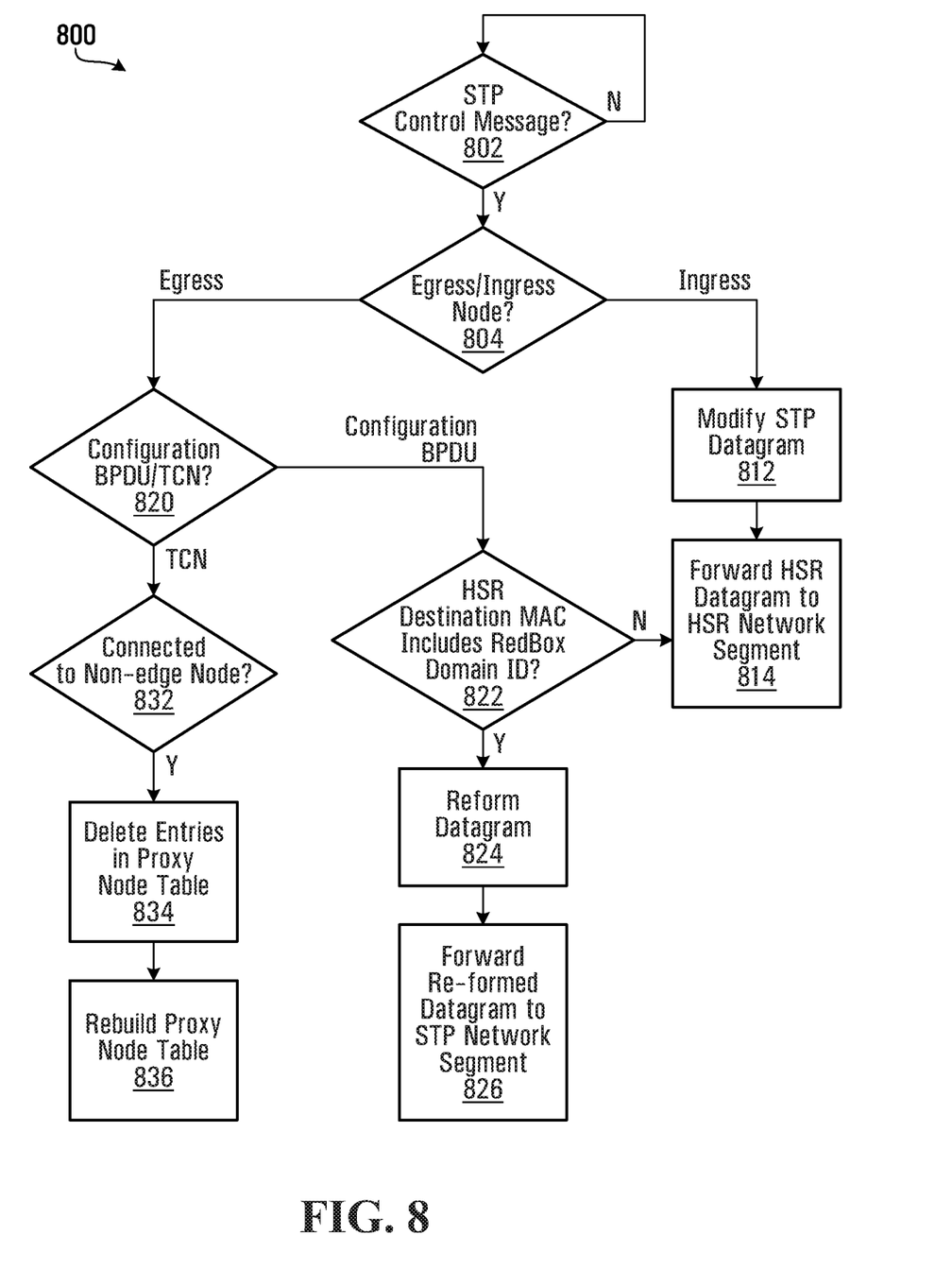
FIG. 8 illustrates a flowchart depicting exemplary blocks performed by a network node of the example network of FIGS. 1A-1B.

Reference is now made to FIG. 8 illustrating an example method 800 for providing a redundant path between nodes of HSR network segment 100 and spanning tree 110. Method 800 may be performed under control of a processor or other controller of RedBox device 102 operating under control of software code stored in memory of RedBox device 102. Software code stored in memory of RedBox device 102 may include an operating system, firmware, and a number of applications. Blocks of method 800 may be performed in-order or out-of-order.

Method 800 may modify STP control messages, such as configuration messages and TCN messages, to prevent DANH devices 104 and RedBox devices 102 of HSR network segment 100 from discarding the STP control messages.

RedBox device 102 may monitor ports 210, 212, and 214 until a STP control message, such as BPDU 520, is received. At 802, RedBox device 102 may determine that it has received an STP control message at one of its ports 210, 212, and 214. RedBox device 102 may determine that it has received an STP control message by identifying a BPDU 520 within the datagram, or by identifying that the message is addressed to a pre-defined STP Bridge Group Address.

In response to receiving a BPDU 520, RedBox device 102 may then determine, at 804, whether it is operating at a point of ingress to HSR network segment 100 or at a point of egress from HSR network segment 100. This determining may be based on which port 210, 212, 214 BPDU 520 was received.

In response to determining, at 804, that RedBox device 102 is operating at a point of ingress to HSR network segment 100 (i.e. BPDU 520 was received at port 214 from bridge 112 encapsulated in an STP datagram 500—FIG. 5), ingress RedBox device 102 may modify, at 812, STP datagram 500 to form HSR datagram 600. HSR datagram 600 includes BPDU 520 but is formatted in adherence with HSR protocol for transmission across HSR network segment 100.

Forming HSR datagram 600 may include replacing the Destination MAC Address of STP datagram 500 with a multicast HSR Supervision Frame MAC Address. Forming the HSR datagram 600 may also include inserting a domain identification value associated with RedBox device 102 to the HSR Supervision Frame MAC Address. Forming the HSR datagram 600 may also include appending an HSR tag 310 to STP datagram 500.

After forming HSR datagram 600, RedBox device 102 may forward, at 814, the HSR datagram 600 via HSR network segment 100 to an egress RedBox device 102, which acts as a point of egress from HSR network segment 100. The egress RedBox device 102 may be configured with the same domain identification value as the ingress RedBox device 102. Ingress RedBox device 102 may forward HSR datagram 600 to HSR network segment 100 via one or both ports 210, 212.

In response to determining, at 804, that RedBox device 102 is operating at a point of egress from HSR network segment 100 (i.e. BPDU 520 was received at either port 210 or port 212 from a DANH device 102 encapsulated in an HSR datagram 600—FIG. 6), RedBox device 102 determines, at 820, whether BPDU 520 is a configuration or a TCN message. RedBox device 102 may distinguish the type of BPDU based on the topology change flag of BPDU 520.

If BPDU 520 is a configuration message, then RedBox device 102 may determine whether HSR datagram 600 includes, in its Destination MAC Address, the same domain identification value as that associated with the egress RedBox device 102. If not, then the egress RedBox device 102 may simply forward, at 814, the HSR datagram 600 via HSR network segment 100 without further processing.

If the domain identification value of the received HSR datagram 600 matches the domain identification value of the egress RedBox device 102, then, the egress RedBox device 102 may re-form, at 824, HSR datagram 600 to form a re-formed STP datagram 700 (FIG. 7). STP datagram 700 includes, as payload, BPDU 520 but is formatted in adherence with STP protocol for transmission across spanning tree 110.

Re-forming STP datagram 700 may include replacing the Destination MAC Address of HSR datagram 600 with a multicast STP Bridge Group Address. Re-forming STP datagram 700 may also include removing HSR tag 310 from HSR datagram 600.

After re-forming STP datagram 700, egress RedBox device 102 may forward, at 826, the re-formed STP datagram 700 via interlink 120 to a bridge 112 of spanning tree 110.

Bridges 112 may be configured to receive re-formed STP datagram 700, and in response to receiving datagram 700, decode STP datagram 700 to extract a spanning tree priority vector. If the spanning tree priority vector of STP datagram 700 identifies that the path, via HSR network segment 100, as a superior path relative to a path taken internally through spanning tree 110, then the receiving bridge 112 may include that path, in a MAC Address Table thereof, as a preferred path to the sending bridge 112. Receiving bridge 112 may then direct STP network traffic through HSR network segment 100.

Therefore, in accordance with method 800, RedBox devices 102 may allow BPDUs 520 to traverse HSR network segment 100. In turn, upon receiving BPDUs 520 from RedBox devices 102, bridges 112 in spanning tree 110 may learn of an alternative path, via HSR network segment 100, to other bridges in spanning tree 110. Bridges 112 may then direct traffic to other bridges 112 via HSR network segment 100 when that path is the most superior path, or the only available path.

Reference is made to FIG. 9, illustrating two paths between bridges 112-C and 112-D of spanning tree 110-B. A first internal path (shown in dotted lines) is via link 130-D and link 130-C. Bridges 112-C and 112-D may learn of the first path by passing STP control messages between one another in accordance with the STP protocol.

A second path (shown in bold lines) is via interlink 120-D to RedBox 102-D, via HSR network segment 100, then to RedBox 102-C via interlink 120-C. Bridges 112-C and 112-D may learn of the second external path by passing STP control messages in accordance with the STP protocol to RedBox devices 102-C and 102-D, which are then processed in accordance with method 800.

If either of links 130-C or 130-D between bridges 112-C and 112-D of spanning tree 110-B is malfunctioning, bridges 112-C and 112-D, being aware of the path between one another via HSR network segment 100 may now immediately direct traffic via HSR network segment 100. Accordingly, by conducting the steps of method 800, bridges 112 may utilize the second external path when an internal link malfunctions as an alternative path.

Reference is now again made to FIG. 8. If at 820, RedBox device 102 determines that it has received a TCN message at either port 210 or 212 (i.e. when a TCN message is received via HSR network segment 100, when RedBox device 102 is at a point of egress from HSR network segment 100), method 800 may proceed to 832. A TCN message may indicate that the cost of a path within spanning tree 110 has changed or that a path is no longer available.

In one embodiment, if RedBox device 102 has an interlink 120 and bridge 112 implemented internally to RedBox device 102, at 832, RedBox device 102 may determine whether the internal bridge 112 is connected to a non-edge node of spanning tree 110. In response to determining that the internal bridge 112 of RedBox device 102 is connected to a non-edge node (for example, another bridge 112), RedBox device 102 may delete, at 834, all entries in its proxy node table 240, as the table may be outdated.

In other embodiments, if RedBox device 102 has no internal bridge 112, processing may automatically proceed to step 834. RedBox device 102 may delete, at 834, all entries in its proxy node table 240, as the table may be outdated.

By deleting entries in proxy node table 240, RedBox device 102 may easily remove all outdated information.

After deleting all entries in its proxy node table 240, RedBox device 102 may rebuild, at 836, proxy node table 240. By deleting and rebuilding proxy node table 240, the proxy node table 240 is maintained in an up-to-date state, allowing for data packets to be directed correctly. Rebuilding proxy node table 240 may include monitoring port 214 of RedBox device 102 for data packets from spanning tree 110.

In one example, a TCN message is used to indicate that a path between HSR network segment 100 and spanning tree 110 is malfunctioning (for example, any one of the following may malfunction: a RedBox device 102, an interlink 120, or a bridge 112 coupled to a RedBox device 102). Upon receiving the TCN message, the RedBox device 102 at the point of failure may clear its proxy node table 240. Thus, the RedBox device 102 at the point of failure will forward the data packets addressed to spanning tree 110 into HSR network segment 100 to be received by a RedBox device 102 with a functional connection to spanning tree 110. Had RedBox device 102 not cleared its proxy node table 240, RedBox device 102 would not have directed data packets to the RedBox device 102 with the functional connection. The RedBox device 102 with a functional connection to spanning tree 110 may forward the data packets to spanning tree 110.

Figure 10:
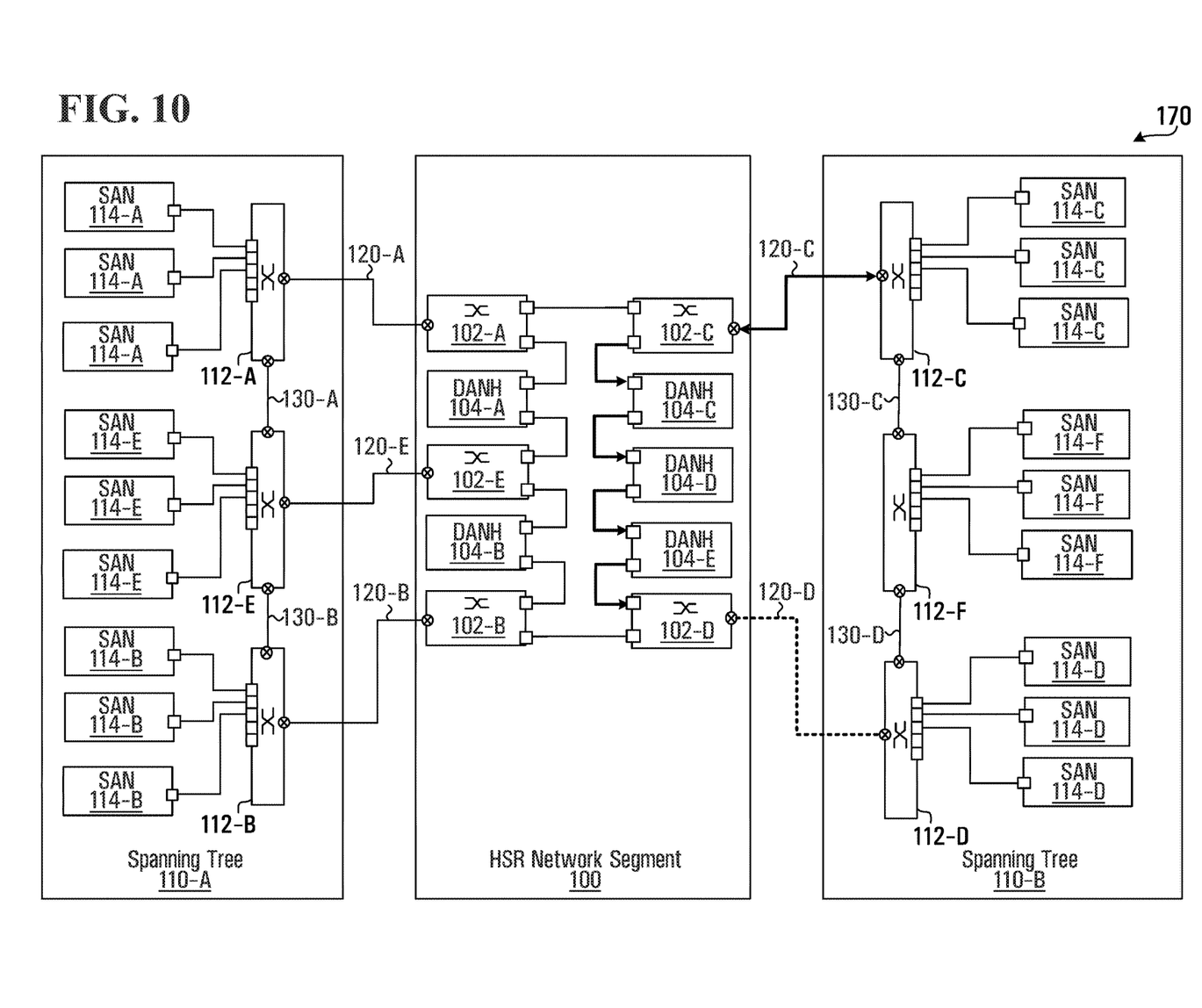

In one particular example, as shown in FIG. 10, interlink 120-D is malfunctioning. A TCN message is sent from bridge 112-D to indicate that interlink 120-D is malfunctioning. The TCN message is propagated to other bridges 112 of spanning tree 110-B. Once the TCN message reaches bridge 112-C, bridge 112-C may also forward the TCN message to RedBox 102-C. RedBox device 102-C modifies the TCN and transmits the modified TCN message to HSR network segment 100. The modified TCN message then reaches RedBox device 102-D, via either port 210 or 212 of RedBox device 102-D. Upon receiving the TCN message, RedBox device 102-D deletes all entries in its proxy node table 240. Thus, RedBox device 102-D will simply pass on the data packets onto HSR network segment 100, which may then be forwarded to spanning tree 110-B by RedBox device 102-C.

Accordingly, by clearing its proxy node table 240, a RedBox device 102 having a non-functional connection to spanning tree 110 will redirect packets directed to spanning tree 110 to a RedBox device 102 having a functional connection to spanning tree 110. Thus, multiple interconnections between spanning tree 110 and HSR network segment 100 may be provided to improve the reliability of communications between spanning tree 110 and HSR network segment 100.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A method of providing a path between nodes of a first network segment configured using a first network control protocol, the method comprising:
providing a second network segment interconnecting first and second nodes of said first network segment, said second network segment operable to transmit control datagrams adherent to a second network protocol and to discard control datagrams adherent to said first network control protocol;
modifying at a point of ingress to said second network segment, control datagrams of said first network control protocol to form modified control datagrams adherent to said second protocol, thereby enabling transport of said modified control datagrams across said second network segment; and
modifying at a point of egress from said second network segment, said modified control datagrams to re-form control datagrams adherent to said first network control protocol, and thereby said second network segment to provide a segment along said path between said first and second nodes configured using said first network control protocol,
wherein the first network control protocol is any one of Spanning Tree Protocol ('STP'), Rapid Spanning Tree Protocol ('RSTP'), and Multiple Spanning Tree Protocol ('MSTP'),
wherein the second network control protocol is a High-availability Seamless Redundancy ('HSR') network protocol,
wherein the control datagrams include a Bridge Protocol Data Unit ('BPDU') message comprising any one of a configuration message and a topology change notification ('TCN') message,
wherein, at the point of ingress, the BPDU message is encapsulated in a STP datagram, a RSTP datagram or a MSTP datagram, and
wherein, at the point of egress, the BPDU message is encapsulated in an HSR datagram.

2. The method of claim 1, further comprising:
receiving at said point of ingress to said second network segment a frame addressed to a plurality of bridges of said first network segment and including a control message adherent to said first network protocol; and
modifying said frame in response to said receiving.

3. The method of claim 1, wherein said first network segment includes a plurality of bridges and wherein said datagrams are control messages for configuring said plurality of bridges.

4. The method of claim 3, wherein a first bridge of said plurality of bridges is configured to send control messages to said point of ingress.

5. The method of claim 3, wherein a second bridge of said plurality of bridges is configured to:
receive said re-formed datagram; and
in response to receiving said re-formed datagram, include, in a MAC address table thereof, said second network segment as a link to said first bridge, and transmit data packets directed to said first bridge across said second network segment.

6. The method of claim 5, wherein said second bridge is configured to include said second network segment in said MAC address table only when said re-formed datagram identifies said second network segment as a superior link to said first bridge.

7. The method of claim 1, further comprising:
receiving at said point of egress a topology change notification message from a bridge of said first network segment; and
in response to said receiving, clearing a proxy table of said point of egress.

8. The method of claim 7, further comprising in response to said receiving, rebuilding said proxy table, and wherein said rebuilding said proxy table comprises monitoring messages from nodes of said first network segment.

9. The method of claim 1, wherein only said first and second nodes interconnect said first network segment and said second network segment, and wherein said link simulates a point-to-point link.

10. The method of claim 1, wherein a third node also interconnects said first network segment and said second network segment, and wherein said link simulates a shared-media link.

11. The method of claim 1, wherein said forming said modified datagrams comprises replacing a Destination MAC Address of a datagram with a replacement Destination MAC Address.

12. The method of claim 1, wherein said replacement Destination MAC Address includes a supervision frame address of said second network segment and a value associated with both said point of ingress and said point of egress.

13. The method of claim 12, wherein said Destination MAC Address is a multicast MAC Address associated with said first network segment.

14. The method of claim 1, wherein said re-forming datagrams is in response to detecting at said point of egress one of said modified datagrams.

15. A system for providing a path, the system comprising:
- a first network segment on which control datagrams adherent to a first network control protocol are passed;
- a second network segment operable to transmit datagrams adherent to a second network protocol and to discard control datagrams adherent to said first network control protocol,
- wherein said first network control protocol is any one of Spanning Tree Protocol ('STP'), Rapid Spanning Tree Protocol ('RSTP'), and Multiple Spanning Tree Protocol ('MSTP') and wherein said second network protocol is a High-availability Seamless Redundancy ('HSR') network protocol; and
- first and second nodes interconnecting said first and second network segments, said first and second nodes providing a point of ingress for said control datagrams to said second network segment and a point of egress for said control datagrams to said first network segment,
- wherein said first and second nodes are configured to:
  - at said point of ingress, modify control datagrams of said first network protocol to form modified control datagrams adherent to said second protocol, thereby enabling transport of said modified control datagrams across said second network segment, and
  - at said point of egress, modify said modified control datagrams to re-form configuration datagrams adherent to said first network protocol, and thereby said second network segment to provide a segment along said path between said first and second nodes configured using said first network control protocol,
- wherein the control datagrams include a Bridge Protocol Data Unit ('BPDU') message comprising any one of a configuration message and a topology change notification ('TCN') message,
- wherein, at the point of ingress, the BPDU message is encapsulated in a STP datagram, a RSTP datagram or a MSTP datagram, and
- wherein, at the point of egress, the BPDU message is encapsulated in an HSR datagram.

* * * * *